United States Patent
Liu et al.

(10) Patent No.: US 11,453,832 B2
(45) Date of Patent: Sep. 27, 2022

(54) EXPERIMENTAL METHOD FOR COAL DESULFURIZATION AND DEASHING USING PERMEATION AND SOLVATING POWER OF A SUPERCRITICAL FLUID

(71) Applicants: SHANXI COKING COAL GROUP CO., LTD., Shanxi (CN); CHINA UNIVERSITY OF MINING AND TECHNOLOGY, Jiangsu (CN); JIANGSU HYDROCARBON CLEAN ENERGY TECHNOLOGY RESEARCH INSTITUTE CO., LTD., Jiangsu (CN)

(72) Inventors: Jinfang Liu, Shanxi (CN); Xiahui Gui, Jiangsu (CN); Yin Peng, Shanxi (CN); Linsheng Gong, Shanxi (CN); Tiezhu Zhao, Jiangsu (CN); Pengde Zhang, Jiangsu (CN); Zijian Ma, Jiangsu (CN)

(73) Assignees: SHANXI COKING COAL GROUP CO., LTD., Taiyuan (CN); CHINA UNIVERSITY OF MINING AND TECHNOLOGY, Xuzhou (CN); JIANGSU HYDROCARBON CLEAN ENERGY TECHNOL.RES.INST, Xuzhou (CN)

( * ) Notice: Subject to any disclaimer, the term of this patent is extended or adjusted under 35 U.S.C. 154(b) by 107 days.

(21) Appl. No.: 17/100,840

(22) Filed: Nov. 21, 2020

(65) Prior Publication Data

US 2021/0155868 A1    May 27, 2021

(30) Foreign Application Priority Data

Nov. 21, 2019    (CN) .......................... 201911147884.2

(51) Int. Cl.
*C10L 9/00* (2006.01)
*B01D 11/02* (2006.01)
(Continued)

(52) U.S. Cl.
CPC ............ *C10L 9/00* (2013.01); *B01D 11/0203* (2013.01); *B01D 11/028* (2013.01); *C10L 9/02* (2013.01);
(Continued)

(58) Field of Classification Search
CPC ...... C10G 1/04; C10G 1/042; B01D 11/0203; B01D 11/028; B01D 2011/005; C10L 9/00; C10L 9/02; C10L 9/04; C10L 9/06
See application file for complete search history.

(56) References Cited

U.S. PATENT DOCUMENTS 5,080,692 A * 1/1992 Lee ........................... C10L 9/02
44/624

FOREIGN PATENT DOCUMENTS

CN       1613987 A1    5/2005
CN       101735008 A    6/2010
(Continued)

*Primary Examiner* — Pamela H Weiss

(57) ABSTRACT

An experimental method for coal desulfurization and deashing using permeation and solvating power of a supercritical fluid includes the following steps. The coal sample is ground and loaded into an extraction kettle with a cover. An inlet valve and an outlet valve of the extraction kettle are opened to circulate the supercritical $CO_2$ fluid in the extraction kettle. The extraction kettle is sealed. By adjusting a temperature and a pressure in the extraction kettle, the supercritical $CO_2$ fluid is kept at its critical point and permeates the coal sample to dissolve organic sulfur, inorganic sulfur and ash in the coal sample. The extraction kettle is depressurized, and the temperature in the extraction kettle is adjusted to gasify the supercritical $CO_2$ fluid. The organic sulfur, the inorganic sulfur and part of the ash are separated (Continued)

from the supercritical $CO_2$ fluid and precipitated at a bottom of the extraction kettle.

3 Claims, 1 Drawing Sheet

(51) Int. Cl.
*B01D 11/00* (2006.01)
*C10L 9/02* (2006.01)
*C10L 9/06* (2006.01)

(52) U.S. Cl.
CPC ............ *C10L 9/06* (2013.01); *B01D 2011/005* (2013.01); *C10L 2290/28* (2013.01); *C10L 2290/544* (2013.01)

(56) References Cited

FOREIGN PATENT DOCUMENTS

| | | |
|---|---|---|
| CN | 101936861 A | 1/2011 |
| CN | 104694147 A | 6/2015 |
| CN | 104974022 A | 10/2015 |
| CN | 104986732 A | 10/2015 |
| CN | 106520164 A | 3/2017 |
| WO | 9107478 A1 | 5/1991 |

\* cited by examiner

EXPERIMENTAL METHOD FOR COAL DESULFURIZATION AND DEASHING USING PERMEATION AND SOLVATING POWER OF A SUPERCRITICAL FLUID

CROSS-REFERENCE TO RELATED APPLICATIONS

This application claims the benefit of priority from Chinese Patent Application No. 201911147884.2, filed on Nov. 21, 2019. The content of the aforementioned application, including any intervening amendments thereto, is incorporated herein by reference in its entirety.

TECHNICAL FIELD

The present application relates to the pre-combustion desulfurization of coal, and more particularly to an experimental method for coal desulfurization and deashing using permeation and solvating power of a supercritical fluid.

BACKGROUND

China has abundant coal resources and is the largest producer and consumer of coal in the word. However, the combustion of sulfur-containing coals leads to high concentration of $SO_2$ and other harmful gases released into the atmosphere, which has a negative impact on human health and the growth of animals and plants. In addition, emissions from coal combustion cause a series of environmental problems such as air pollution, acid rain and climate change. So, coal desulfurization is urgently needed before the combustion.

Inorganic sulfur can be effectively removed from coal by physical methods, such as gravity separation and deashing. However, there is a large variation of organosulfur compounds, including aliphatic sulfur, such as thioether and mercaptan, and conjugated sulfur, such as thiophene sulfur, sulfone sulfur and sulfoxide sulfur. The major coal desulphurization techniques are physical coal cleaning, chemical and biological methods. Each has some technical and economical limitations. For example, the physical coal cleaning is commercially deployed and widely applied, but it can remove only the inorganic sulfur. The chemical and biological methods can remove both the inorganic sulfur and part of aliphatic organic sulfur, but they have limited ability to remove the organic sulfur with conjugated macromolecules, in addition, they have high processing costs and cannot be applied for industrial use.

In some coal desulphurization methods, sulfur-fixing agents are added. However, it should be considered that the addition of these chemical reagents influence and change the quality of the coal, and a follow-up process is required for removing these chemical reagents, which complicates the whole process. Moreover, coal gasification and liquefaction are still under development and require more efforts to become applicable.

As the coal density increases, the content of the aliphatic organic sulfur like thioether and mercaptan decreases, and the content of the conjugated organic sulfur like thiophene sulfur and sulfoxide sulfur increases, which makes the removal of the organic sulfur more difficult.

In summary, the exiting pre-combustion desulphurization techniques have the problems as follows: 1) the organic sulfur cannot be removed in large amounts from the coal; 2) the process is complex and costly, and the large-scale industrialization cannot be realized; and 3) the addition of desulfurization agents is required during the coal treatment for some methods, however, the added desulfurization agents not only influence the characteristics of the coal, but also need to be removed after the desulfurization, which leads to complicated process.

Therefore, it is urgent to develop a method for effectively removing the complex organosulfur compounds from the coal.

SUMMARY

Given the above, the present application provides an experimental method for coal desulfurization and deashing using permeation and solvating power of a supercritical fluid, by which complex organosulfur compounds are effectively removed from the coal.

The technical solutions of the present application will be described as follows.

The present application provides an experimental method for coal desulfurization and deashing using permeation and solvating power of a supercritical fluid, comprising:

1) grinding a coal sample;

2) preparing an extraction kettle with a cover; opening an inlet valve and an outlet valve of the extraction kettle, so that the extraction kettle is connected to a container in which a supercritical $CO_2$ fluid is stored; circulating the supercritical $CO_2$ fluid in a closed system of the extraction kettle; introducing ethanol into a pipeline of the closed system by a pump to clean the pipeline; and closing the outlet valve of the extraction kettle to ensure an air tightness of the extraction kettle;

3) loading the coal sample obtained in step 1) into the extraction kettle; and screwing the cover of the extraction kettle to seal the extraction kettle;

4) adjusting a density of the supercritical $CO_2$ fluid by adjusting a temperature and a pressure in the extraction kettle, so that the supercritical $CO_2$ fluid is kept at its critical point; re-adjusting the temperature and the pressure in the extraction kettle to allow the supercritical $CO_2$ fluid to permeate the coal sample and then dissolve organic sulfur, inorganic sulfur and ash in the coal sample, thereby separating the organic sulfur, the inorganic sulfur and the ash from the coal sample;

5) depressurizing the extraction kettle, and adjusting the temperature in the extraction kettle by a heat exchanger, such that the supercritical $CO_2$ fluid is gasified, and the organic sulfur, the inorganic sulfur and the ash are separated from the supercritical $CO_2$ fluid and precipitated at a bottom of the extraction kettle, thereby completing coal desulfurization and deashing; and 6) closing the inlet valve of the extraction kettle and opening the outlet valve of the extraction kettle to discharge gaseous $CO_2$ or recycle the gaseous $CO_2$ by a cooling system; disconnecting a gas piping; stopping heating to allow the coal sample to cool down; opening the extraction kettle to take out the coal sample; soaking the obtained coal sample in acetone for extraction; washing the coal sample using deionized water and then drying the coal sample.

In the present application, a supercritical fluid technique is adopted as a core technique, in which the adjustment of the temperature and the pressure is involved. The solubility of solute in the supercritical $CO_2$ fluid is related to the density of the supercritical $CO_2$ fluid, however, the temperature and the pressure together determine the density of $CO_2$. By changing the temperature and the pressure, $CO_2$ becomes in a supercritical state and obtains the ability of selective dissolution and separation.

The organic sulfur is effectively removed from the coal, which benefits the substantial reduction in dust. The experimental method of the present application has simple process and easy operation. It is easy to realize the control to the temperature and the pressure, which is suitable for large-scale industrialization. At the same time, $CO_2$ is non-toxic and non-polluting to raw materials and has no influence to the coal quality.

$CO_2$ in the supercritical state has good permeability and ability to dissolve substances to be removed, in contrast, $CO_2$ in a non-supercritical state has low permeability and poor ability to dissolve the substances to be removed. That is, the fluid in the supercritical state can permeate into micro-pores inside the coal to selectively dissolve organic solutes in the micro-pores, and then flows out with the organic solutes followed by rapid condensation, thereby separating the organic solutes from the coal.

In the present application, an extraction kettle with a cover is used, such that solid materials can be frequently loaded or unloaded from the reactor under high pressure conditions. The supercritical fluid is a supercritical $CO_2$ fluid, which has low viscosity, good characteristics of mass transfer, diffusibility and compressibility, and good solvating power for highly polar solvents. In addition, the supercritical $CO_2$ fluid is safe, energy-saving, and pollution-free extraction solvent and thus it is used as an extracting solvent in the present application.

In some embodiments, in step 1), a particle size of the coal sample is 1-3 mm or 3-6 mm.

In some embodiments, in step 4), the temperature in the extraction kettle is raised to 35-40° C., and the pressure in the extraction kettle is raised to 7-10 MPa, to make $CO_2$ in a supercritical state.

Compared to the prior art, the present application has the following beneficial effects.

1) In the experimental method of the present application, the organic sulfur and the inorganic sulfur can be removed in large amounts from the coal, specifically, 23% organic sulfur is removed, and 70% inorganic sulfur is removed, and ash content is reduced by 32%.

2) The experimental method of the present application involves low cost and simple process, and the temperature and the pressure thereof can be easily controlled. In addition, $CO_2$ is readily available and cost-effective, and it can be recycled, which helps to realize large-scale industrialization.

3) The experimental method of the present application adopts $CO_2$ which does not remain in products to avoid pollution to the products and eliminate a subsequent treatment, as against some existing desulfurization methods in which desulfurization agents are adopted for coal treatment, and the added desulfurization agents not only influence the characteristics of the coal, but also need to be removed after the desulfurization, which complicates the process.

DETAILED DESCRIPTION OF EMBODIMENTS

The present application will be further described below with reference to the embodiments.

Figure 1:
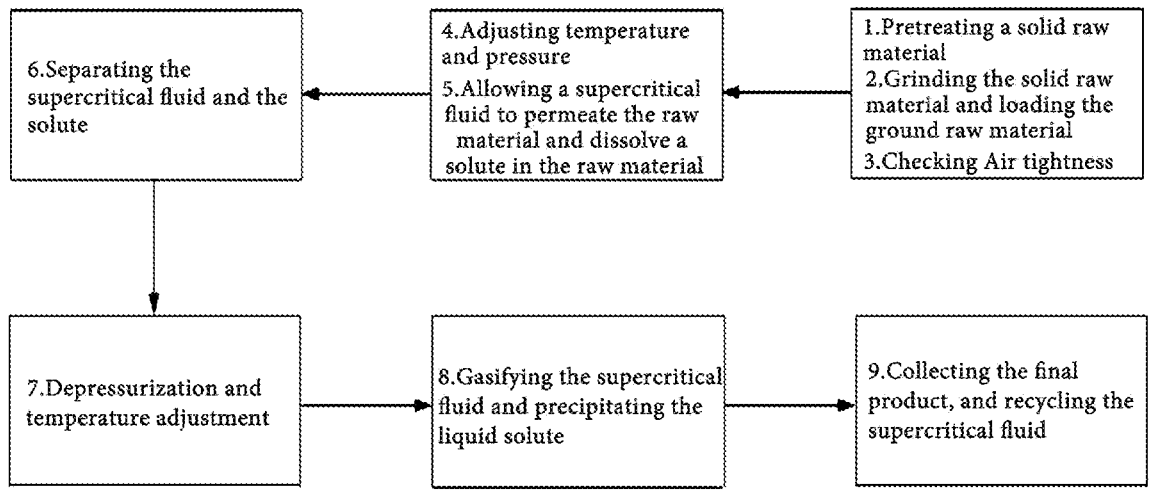
FIG. 1 is a flowchart of an experimental method for coal desulfurization and deashing using permeation and solvating power of a supercritical fluid according to the present application.
Figure 2:
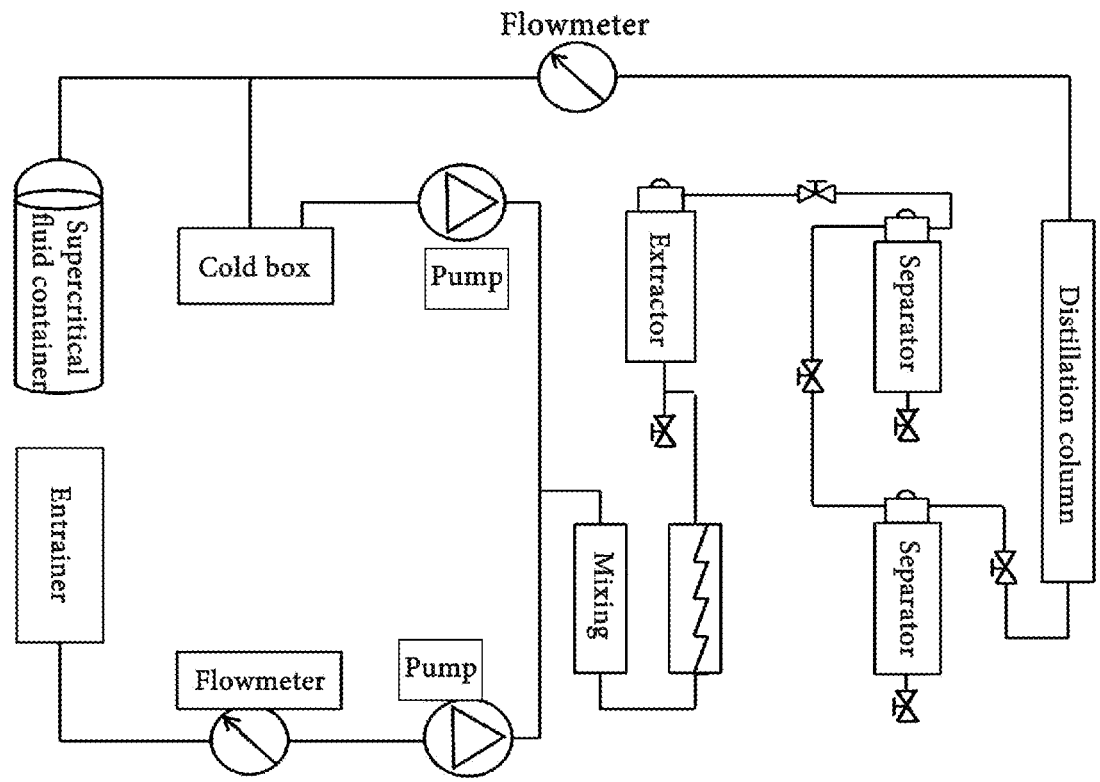
FIG. 2 is a schematic diagram of a device using the experimental method of the present application.

An experimental method for coal desulfurization and deashing using permeation and solvating power of a supercritical fluid, as shown in FIGS. 1-2, includes the following steps.

1) Sample Pretreatment

A coal sample is ground until it has a particle size of 1-3 mm or 3-6 mm.

2) Removal of Air and Impurities in an Extraction Kettle with a Cover

An inlet valve and an outlet valve of the extraction kettle are opened to connect the extraction kettle and a container in which a supercritical $CO_2$ fluid is stored. The supercritical $CO_2$ fluid is circulated in a closed system of the extraction kettle. Ethanol is introduced into a pipeline of the closed system by a pump to clean the pipeline. The outlet valve of the extraction kettle is closed to ensure an air tightness of the extraction kettle.

3) Sample Loading

The coal sample obtained in step 1) is loaded into the extraction kettle. The cover of the extraction kettle is screwed to seal the extraction kettle.

4) Desulfurization Experiment 4.1) Adjustment of Temperature and Pressure

A density of the supercritical $CO_2$ fluid is adjusted by adjusting a temperature and a pressure in the extraction kettle, so that the supercritical $CO_2$ fluid is kept at its critical point. The temperature and the pressure in the extraction kettle are re-adjusted such that the supercritical $CO_2$ fluid permeates the coal sample and then dissolve organic sulfur, inorganic sulfur and ash in the coal sample, thereby separating the organic sulfur, the inorganic sulfur and the ash from the coal sample.

4.2) Separation of the Organic Sulfur, the Inorganic Sulfur and the Ash from the Supercritical $CO_2$ Fluid The extraction kettle is depressurized, and the temperature in the extraction kettle is adjusted by a heat exchanger, such that the supercritical $CO_2$ fluid is gasified, and the organic sulfur, the inorganic sulfur and part of the ash are separated from the supercritical $CO_2$ fluid and precipitated at a bottom of the extraction kettle, thereby completing coal desulfurization and deashing.

5) Sample Collection and Subsequent Processing

After the experiment, the inlet valve of the extraction kettle is closed and the outlet valve of the extraction kettle is opened to discharge gaseous $CO_2$ or recycle the gaseous $CO_2$ by a cooling system; disconnecting a gas piping. A gas piping is disconnected. Heating stops and the coal sample gradually cools down. The extraction kettle is opened to take out the coal sample. The obtained coal sample is soaked in acetone for extraction and washed using deionized water followed by drying the coal sample for testing the coal sample.

A raw coal from Gaoyang, Baoding City, Hebei province, China was used in an embodiment as follows. Organic sulfur was removed from the raw coal using a SC—$CO_2$ method.

1) Sample Pretreatment

A coal sample was ground until it had a particle size of 1-3 mm or 3-6 mm.

2) Removal of Air and Impurities in an Extraction Kettle with a Cover

An inlet valve and an outlet valve of the extraction kettle were opened to connect the extraction kettle and a $CO_2$ cylinder, where a pressure of the $CO_2$ cylinder at an outlet thereof was kept within 5-6 MPa. The supercritical $CO_2$ fluid was circulated in a closed system of the extraction kettle, and at the same time, the closed system was kept at a required pressure. Ethanol was introduced into a pipeline of the closed system by a pump to clean the pipeline. The outlet valve of the extraction kettle was closed to ensure an air tightness of the extraction kettle.

3) Sample Loading

The coal sample obtained in step 1) was weighted and loaded into a sample container, and then a filter, a gasket, a porous plate and a threaded ring were placed into the sample container in sequence. A special handle was used to place the sample container into a sample cavity of the extraction kettle. Specifically, the coal sample in the sample container was about 2-3 cm away from the filter arranged above the coal sample to ensure that the sample container was not completely filled with the coal sample. Preferably, the gasket was O-shaped, and the porous plate was made of steel. The threaded ring was screwed into the sample container for the compressing purpose. A volume of the sample cavity was 1 L.

Subsequently, the cover of the extraction kettle was screwed to seal the extraction kettle.

4) Desulfurization Experiment

A device using the experimental method of the present application was provided with a plurality of circulating water tanks. Before the operation of the device, the circulating water tanks were filled with water, and then the water was heated by an electric heating tube. The heated water was transferred by a circulating pump for heating the extraction kettle and keeping it at a required temperature. The device was also provided with a cool box, and a 30% by weight of aqueous glycol solution was stored in the cool box. The cooling water source was kept unblocked relative to a water-cooled unit.

4.1) Adjustment of Temperature and Pressure

In the SC—$CO_2$ process, a density of the supercritical $CO_2$ fluid was adjusted by adjusting a temperature and a pressure in the extraction kettle, so that the supercritical $CO_2$ fluid was kept at its critical point. The temperature and the pressure in the extraction kettle were re-adjusted such that the supercritical $CO_2$ fluid dissolved and separated substances to be removed. During which, the pressure in the extraction kettle and the extraction kettle were always kept at a required value, until the coal sample was taken out of the device.

4.2) Separation of a Solute from the Supercritical $CO_2$ Fluid

The supercritical $CO_2$ fluid permeated the coal sample within a set time to dissolve organic sulfur and inorganic sulfur in the coal sample. The removal of the inorganic sulfur was accompanied by a decrease in an ash content. After decompression, the supercritical $CO_2$ fluid was separated from the organic sulfur, thereby completing the coal desulfurization and deashing.

4.3) Depressurization and Heat Exchange

The extraction kettle was depressurized and a temperature in the extraction kettle was adjusted via a heat exchanger, so as to gasify the supercritical $CO_2$ fluid and precipitate the separated liquid organic sulfur at a bottom of the extraction kettle. Gaseous $CO_2$ was discharged or recycled by a cooling system.

5) Sample Collection and Subsequent Processing

After the experiment, a refrigerator pump stopped working, and a $CO_2$ plunger pump also stopped working. Preferably, the $CO_2$ plunger pump was a high pressure pump. In addition, the heating and circulation of circulating water were stopped. The inlet valve of the extraction kettle was closed and the outlet valve of the extraction kettle was opened to release gaseous $CO_2$ in the extraction kettle. A gas piping was disconnected. Heating stopped and the coal sample gradually cooled down. The extraction kettle was opened to take out the coal sample. The obtained coal sample was soaked in acetone for extraction and washed using deionized water followed by drying the coal sample for next testing.

According to the comparison between test data after the reaction and test data before the reaction, the content of the sulfur and the ash in the coal is significantly reduced, and the cohesiveness and calorific value are basically unchanged, which indicates that the organic sulfur is effectively separated, and at the same time, the method of the present application does not affect the quality of the coal.

Comparative experiments are made by changing various variables, such as the temperature, the pressure, the treatment time. The results are shown in Table 1 as follows.

TABLE 1

| | Temperature | Pressure | Time | Sulfur Content | Ash Content | Volatile Content | Coke Slag Characteristic | Cohesiveness | Heat value |
|---|---|---|---|---|---|---|---|---|---|
| Raw sample | | | | 2.26 | 10.57 | 18.62 | 5 | 68.03 | 31.54 |
| Sample 1 | 35 | 10 | 2 | 2.04 | 7.22 | 19.38 | 4 | 60.89 | 30.74 |
| Sample 2 | 35 | 10 | 5 | 1.80 | 7.14 | 18.83 | 5 | 58.01 | 32.05 |
| Sample 3 | 35 | 10 | 14 | 1.69 | 6.56 | 19.19 | 5 | 65.93 | 31.74 |
| Sample 4 | 35 | 10 | 24 | 1.85 | 6.48 | 16.87 | 5 | 63.09 | 31.70 |
| Sample 5 | 37 | 8 | 8 | 1.78 | 6.84 | 19.02 | 5 | 69.17 | 31.93 |
| Sample 6 | 37 | 9 | 14 | 1.75 | 6.83 | 19.03 | 5 | 63.48 | 32.00 |
| Sample 7 | 37 | 8 | 24 | 1.80 | 6.30 | 18.92 | 5 | 66.75 | 32.31 |

The above-mentioned is only some preferred embodiments. It should be noted that any improvements and modifications may be made by those skilled in the art without departing from the principle of the disclosure, and shall fall within the scope of the present disclosure.

What is claimed is:

1. An experimental method for coal desulfurization and deashing using permeation and solvating power of a supercritical fluid, comprising:
   1) grinding a coal sample;
   2) preparing an extraction kettle with a cover; opening an inlet valve and an outlet valve of the extraction kettle, so that the extraction kettle is connected to a container in which a supercritical $CO_2$ fluid is stored; circulating the supercritical $CO_2$ fluid in a closed system of the extraction kettle; introducing ethanol into a pipeline of the closed system by a pump to clean the pipeline; and closing the outlet valve of the extraction kettle to ensure an air tightness of the extraction kettle;
   3) loading the coal sample obtained in step 1) into the extraction kettle; and screwing the cover of the extraction kettle to seal the extraction kettle;

4) adjusting a density of the supercritical $CO_2$ fluid by adjusting a temperature and a pressure in the extraction kettle, so that the supercritical $CO_2$ fluid is kept at its critical point; re-adjusting the temperature and the pressure in the extraction kettle to allow the supercritical $CO_2$ fluid to permeate the coal sample and then dissolve organic sulfur, inorganic sulfur and ash in the coal sample, thereby separating the organic sulfur, the inorganic sulfur and the ash from the coal sample;

5) depressurizing the extraction kettle, and adjusting the temperature in the extraction kettle by a heat exchanger, such that the supercritical $CO_2$ fluid is gasified, and the organic sulfur, the inorganic sulfur and part of the ash are separated from the supercritical $CO_2$ fluid and precipitated at a bottom of the extraction kettle, thereby completing coal desulfurization and deashing; and 6) closing the inlet valve of the extraction kettle and opening the outlet valve of the extraction kettle to discharge gaseous $CO_2$ or recycle the gaseous $CO_2$ by a cooling system; disconnecting a gas piping; stopping heating to allow the coal sample to cool down; opening the extraction kettle to take out the coal sample; soaking the obtained coal sample in acetone for extraction; and washing the coal sample using deionized water and then drying the coal sample.

2. The experimental method of claim 1, wherein in step 1), a particle size of the coal sample is 1-3 mm or 3-6 mm.

3. The experimental method of claim 1, wherein in step 4), the temperature in the extraction kettle is raised to 35-40° C., and the pressure in the extraction kettle is raised to 7-10 MPa, to make $CO_2$ in a supercritical state.

* * * * *